Dec. 8, 1964     W. FISCHER     3,160,457
ELECTRICAL CONNECTING DEVICE
Filed Nov. 30, 1962

INVENTOR
WALTER FISCHER
By Emory L. Groff Jr.
Atty

United States Patent Office 3,160,457
Patented Dec. 8, 1964

3,160,457
ELECTRICAL CONNECTING DEVICE
Walter Fischer, 19 Rue des Charpentiers,
Morges, Vaud, Switzerland
Filed Nov. 30, 1962, Ser. No. 241,248
Claims priority, application Switzerland, Dec. 2, 1961,
14,036/61
2 Claims. (Cl. 339—91)

The present invention concerns an electric connecting device.

This electric connecting device is formed of two end parts each adapted to be connected to the end of at least one electric conductor, one of these parts carries at least one pin and the other at least one corresponding female member in which the pin is adapted to be engaged in a coupled position of the parts, a slidable bolting device or third part is located between the two above parts and is adapted to prevent the premature axial disengagement of the pin out of the female member, the body of each of the two end parts comprising a tubular member, these two tubular members being adapted to engage one in the other in a coupled position.

There are already known electric connecting devices of the type defined above. However, in these known devices orifices are provided through at least one of the two tubular members to permit the functioning of the bolting device. These orifices render perfect watertightness of these devices impossible, especially insofar as the introduction of humidity towards the contacts is concerned.

One object of the present invention is to overcome this difficulty by means including completely internal bolting means.

Further objects of the invention will be brought out in the following specification, wherein detailed description is for the purpose of fully disclosing a preferred species of the invention without placing limitations thereon.

According to the present invention a device of a type defined above is characterised by the fact that a third tubular element or socket, axially secured with play to one of the tubular members and presenting at least one elastic tongue, is adapted to be placed between the two tubular end members once these are engaged in each other, the second of these tubular members presenting a border in the form of a steep ramp adapted to force the tongue of the third element transversely against the first tubular member when tensile forces are exerted in the opposite direction on the two tubular end members tending to separate them, this socket presenting gripping means so arranged that the disengagement of the ends one from the other is effected by acting on the bolting socket.

The invention will now be described further, by way of example, with reference to the accompanying drawings, in which FIG. 1 is an axial section of the connecting device showing the two main elements in the engaged position;

Figure 1:
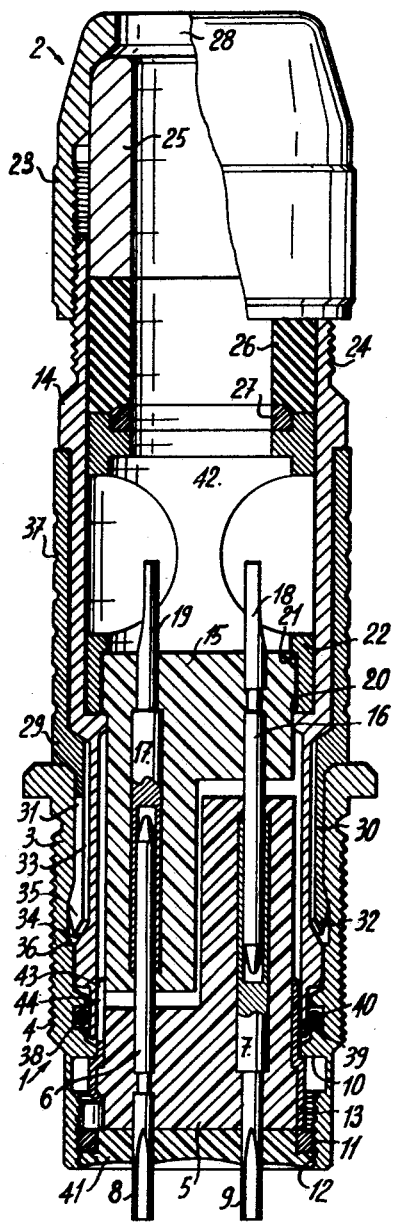
Figure 3:
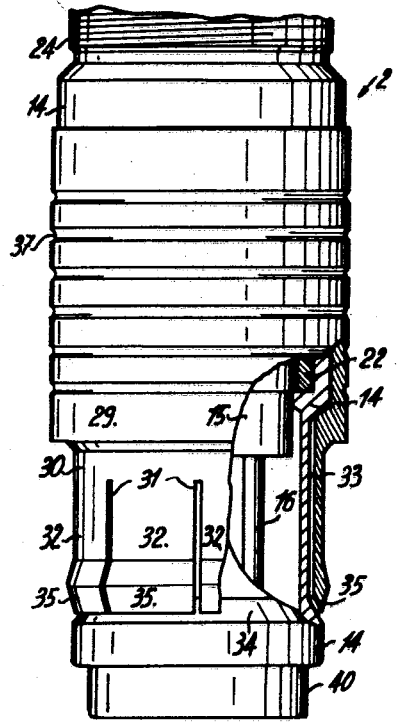
FIG. 3 is a view of the upper end formed of a second and third element.
Figure 2:
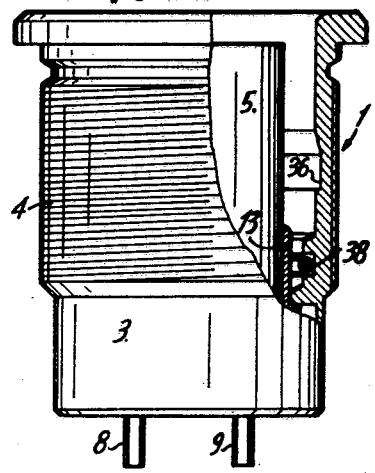
FIG. 2 is a view of the first or lower element alone.

The electric connecting device, which is of the bipolar type in the example shown, comprises two principal end parts generally denoted 1 and 2, each adapted to be coupled to the end of at least one electric conductor. As, in the example shown, the device is bipolar, two electric conductors can be coupled to each end part 1 and 2.

The body of the first end 1 comprises a tubular element 3 which is exteriorly threaded at 4 to permit its mounting, for example in a machine frame. A block of insulating material 5 is engaged in the tubular member 3, in which block is fixed, a pin 6 and a corresponding female member 7. This pin 6 and this member 7 each have extensions 8, and 9 respectively, to which the ends of the electric conductors (not shown) are to be fixed. The block of insulating material 5 is fixed between a shoulder 10, provided inside the tubular element 3, and a ring 11. This ring 11, which is externally threaded, is screwed, inside the tapped end 12 of the first tubular element 3.

In the example shown, a metal socket 13 of good conductivity, as for example brass, is pinched between the ring 11 and the shoulder 10 as an intermediary piece for fixing the insulating block 5. As will be described later on, this socket is adapted to permit grounding of the metallic conducting outside parts of the electric connecting device.

The body of the top end of this device comprises a second monolithic tubular element 14, the lower part of which at least has a smaller section than that of the first tubular element 3, to permit its engagement inside said first element. A block 15 of insulating material, carrying a pin 16 and a female member 17 of corresponding shape, is fixed in the second tubular element 14, the members 16 and 17 being adapted to engage with the members 6 and 7 in an electric connecting position. These members 16 and 17 have extensions 18 and 19 respectively, on which there are adapted to be fixed the ends of electric conductors (not shown).

The block 15 of insulating material is held between a shoulder 20 provided inside the tubular member 14 and a shoulder 21 provided on a member 22 engaged inside of the second tubular member 14. This member 22 is held secured against the shoulder 20 by a cap 23 screwed on a threaded part 24 of the tubular member 14. A tube 25, axially forcing against one end of an elastically deformable ring 26, is disposed in the cap 23. The other end of the ring 26 itself acts against the member 22. An interchangeable ring 27 is engaged in a throat provided in the end of the member 22. This ring 27 can be replaced by another ring the central aperture of which has a different dimension in accordance with the diameter of the insulating envelope of one or more conductors engaged in the tubular element 14.

The tightening of the cap 23 on the threaded part of the element 14 not only maintains the insulating block 15 in place but simultaneously ensures, by sidewise swelling of the ring 26, due to endwise compressive forces, an interior diameter reduction, and thus a holding or a fixing of the envelope of insulating material of the conductor engaged in the tubular element 14. The conductor passes through an opening 28 presented by the cap 23.

A bolting device is adapted to prevent the premature axial disengagement of the second tubular element 14 out of the first tubular element 3. This bolting device comprises a double shouldered socket portion 29 having a cylindrical extension 30 of reduced section within the first element 3, the extension having several longitudinal slots 31 so as to form several elastic tongues 32 contacting the inside of element 3. This extension 30 is axially secured to 29, with radial play or clearance, with respect to the adjacent throat diameter of the tubular member 14. In effect this presents a throat 33 in which the extension 30 engages. A border 34 of this throat 33 is in the form of a steep conical ramp. The ramp 34 is adapted to act on the thickened ends 35 of the tongues 32 to effect their radial separation, in the case where the opposed axial tension forces act on the two tubular members 3 and 14 to separate them one from the other. The tubular element 3 has an inwardly open throat or recess with a steep roof, a contiguous underlying side wall and a horizontal annular floor. The ends 35 of the tongues 32 catch in this throat when the latter are expanded by the conical ramp 34.

I claim:
1. An electrical connector comprising in combination,
(A) a first element having a monolithic tubular member extending from one extreme end or bottom of the connector towards a midportion thereof, and terminating at its top in an outwardly directed shoulder, the inner surface of said first tubular element including a generally cylindrical portion with a medially positioned inwardly open throat or recess, said recess being formed with a steeply downwardly and outwardly conical roof, a contiguous underlying cylindrical side wall and a horizontal annular floor,
(B) a second element having a monolithic tubular member with a first and lower portion within a major portion of said first element and near said one extreme or bottom end of the connector and with an outside diameter at such location as to make a sliding fit with the adjacent inner diameter of said first element,
(C) said second element also having a second and medial portion longitudinally adjacent and above its said first portion, said second portion possessing a reduced constant diameter annular throat of such magnitude as to provide a constant annular clearance between its diameter and the adjacent generally cylindrical inner surface portion of said first tubular member, said annular throat extending above the outwardly directed shoulder of said first element and terminating at its upper end with an outwardly directed upwardly slanting shoulder, said throat terminating at its bottom with a steeply sloping conical ramp,
(D) said second element also having a third and upper portion extending from said slanting shoulder upwardly towards the opposite and upper end of the connector and possessing near its top an outwardly directed and shoulder containing abutment ring,
(E) each of said first and second elements having individual structures therein connectable to an end of at least one electrical conductor, said first element including in such structure at least one extended pin member, said second element including in such structure at least one deep female sleeve member for side engagement with the said pin member of said first element, when said first and second elements are in engaged position,
(F) and a third tubular element or bolting means radially between and contacting adjacent midportions of both said first and second elements for preventing premature axial disengagement of a pin member out of a female member when said first and second elements are in engaged position, said third element bolting means including a medially positioned combined inward and outward shouldered portion outwardly contacting from above the outwardly directed shoulder of said first member, and simultaneously inwardly contacting at an elevated position with respect to said outer shoulder the slanting shoulder of said second element,
(G) said third element below the combined shoulder portion having a downwardly extending cylindrical skirt extension slidably contacting the inner surface of said first element and radially spaced from the throat of said second tubular element, plural longitudinal slots in said skirt extension forming therebetween a plurality of elastic tongues the lower end of each tongue being thickened in an outward direction only, and including near its lower end on its outer side a downwardly and outwardly directed conical surface conforming exactly to the roof surface of the recess within the first element, at the extreme lower end of each tongue, there being an arcuate knife-like shape formed by the intersection of the surfaces of an inner upright cone and an outer inverted cone, the inner conical surface of each tongue being concentric with and spaced from the surface of said conical ramp of the second element, the extreme lower end of each tongue in the above position of parts being longitudinally spaced from the plane of said annular floor of the first element,
(H) the maximum thickness of the tongues being such that when said third element is drawn upward to disconnect said pin and sleeve, the tongue will be flexed inward from its above recited position and the thickened end of the tongue will slidably fill the annular space between the inside of the first element and the throat of the second element,
(I) and the degrees of inclination of the ramp of the second element and the roof of the recess of the first element together with the respectively adjacent surfaces of tongue ends being such that the tongue will remain in outward contacting position and in locked relationship with respect to the conical roof surface of the recess in the first element when the second element only is drawn upwardly.
2. The electrical connector of claim 1, wherein,
(A) a second inwardly directed open throat is within said first element, the lower end of said second element extends downwardly past said second throat,
(B) and a water-tight packing in the form of an O-ring member extends from within said second open throat and is pinched between said elements when engaged one in the other.

References Cited by the Examiner

UNITED STATES PATENTS

| 2,983,893 | 5/61 | Jackson | 339—91 |
| 3,040,287 | 6/62 | Agron et al. | 339—94 |
| 3,091,749 | 5/63 | Felts | 339—75 |
| 3,097,033 | 7/63 | Felts | 339—75 |

FOREIGN PATENTS 1,201,817   7/59   France.

M. HENSON WOOD, Jr., *Primary Examiner.*

JOSEPH D. SEERS, THOMAS J. HICKEY, *Examiners.*